Figure 1:
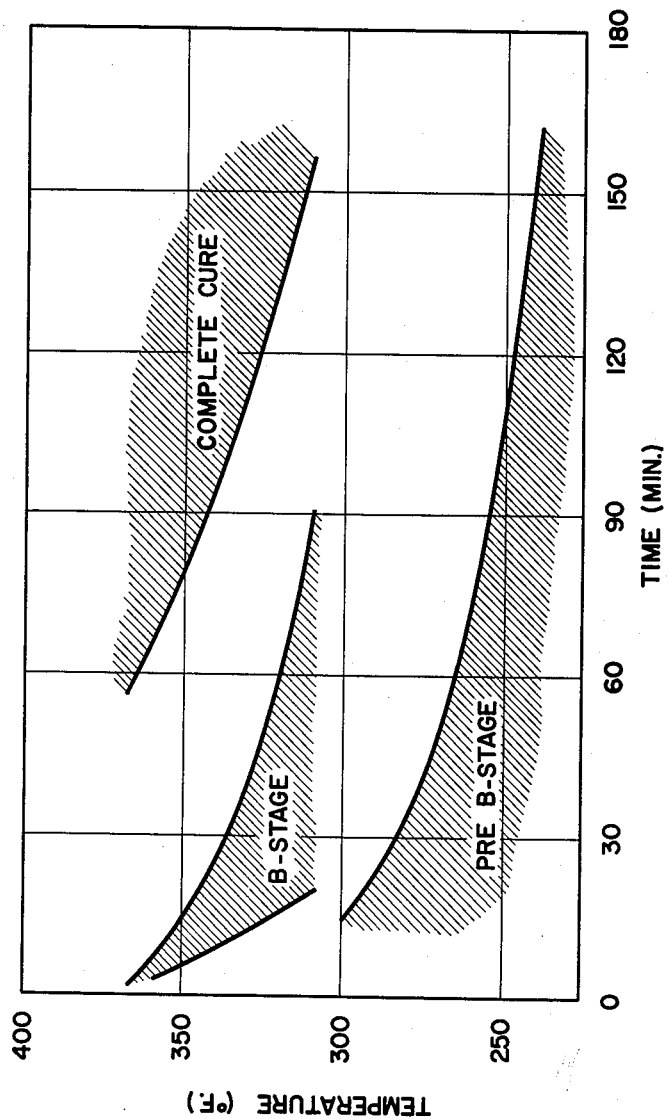

COMPARISON OF A PRE B-STAGE CURE,
A B-STAGE CURE, AND A FINAL CURE

Ober C. Slotterbeck
Julian Lakritz  INVENTORS

3,079,295
RESINIFICATION BY A GRAFTING TECHNIQUE
Ober C. Slotterbeck and Julian Lakritz, Rahway, N.J., assignors to Esso Research and Engineering Company, a corporation of Delaware
Filed May 29, 1959, Ser. No. 816,971
10 Claims. (Cl. 156—334)

This invention relates to a method for grafting a polydiolefin with a reactive monomer and simultaneously increasing viscosity without appreciably decreasing reactivity of the system, and more particularly it is concerned with an improved resin and/or reinforced plastic therefrom.

It is known to prepare a resin by subjecting a resinifiable mix with a curable liquid polydiolefin therein to a continuous cure at elevated temperatures. Furthermore, it is also known to laminate the resinifiable mix with a reinforcing element to provide a hard, solid reinforced plastic therefrom.

In the past, the time required for curing a polydiolefin has been relatively long. The use of higher temperatures has shortened the cure time. However, when cured under low pressure at these high temperatures, the laminated end products have contained a multitude of small bubbles due to volatility of the reactive monomer. As a result, the laminates have had relatively poor water resistance and physical properties.

It has now been discovered that the aforementioned problems can be alleviated by employing a grafting polymerization technique. Thus, in accordance with one embodiment of this invention, a resinifiable mix is prepared comprising a curable polydiolefin; a crosslinking agent, e.g., vinyl toluene; and a peroxide catalyst with an inert solvent or excess monomer. This mix is then reacted at elevated temperatures to form a pre-B-stage product. This new graft polymer, with additional monomer and catalyst incorporated therein, is subsequently laminated under pressure and at elevated temperatures with a reinforcing element, e.g., glass fiber or paper, and cured in a closed mold to form a bubble-free reinforced plastic in a relatively short period of time.

The curable liquid polymers incorporated in the resinifiable mix of this invention are prepared from diolefins, particularly those which are conjugated and have 4 to 6 carbon atoms per molecule, such as butadiene, hexadiene, isoprene, dimethyl butadiene, piperylene, and methyl pentadiene. Diolefins may be used which are copolymerized with minor amounts of ethylenically unsaturated monomers, such as styrene, acrylonitrile, methyl vinyl ketone; or with styrenes having alkyl groups substituted on the ring, e.g., paramethyl styrene, dimethyl styrene, etc. A suitable diolefin polymeric oil is one prepared by reacting 75 to 100 parts of butadiene, preferably 75–85 parts, with 25 to 0 parts, preferably 25–15 parts, of styrene in the presence of metallic sodium catalyst. Polymerization is carried out in a reaction diluent at temperatures from about 25° C. to 105° C. with about 0.5 to 5 parts of finely divided sodium per 100 parts of monomers used. The diluent used in the polymerization must boil between about —15° C. and 200° C., in amounts ranging from 100 to 500 parts per 100 parts of monomers; preferred diluents are aliphatic hydrocarbons such as solvent naphtha or straight-run mineral spirits such as Varsol. In order to obtain a water white product, a codiluent, about 10 to 45 parts per 100 parts of monomers, may also be used, consisting of a $C_4$ to $C_8$ aliphatic ether or cyclic ethers and polyethers other than those having a —O—C—O— grouping; particularly useful ethers are dioxane 1,4 and diethyl ether. Finally, it is beneficial to use about 5 to 35 weight percent, based on sodium, of an alcohol such as methanol, isopropyl alcohol, or an amyl alcohol in order to overcome the initial induction period. The resulting product may vary in viscosity from 0.15 to 20 poises. The preparation of this oil in the presence of an alkali metal or peroxide catalyst is described in U.S. Patents 2,762,851 and 2,586,594, which are incorporated herein by reference.

Besides the curable polydiolefin heretofore described, the resinifiable mix comprises a crosslinking agent and a catalyst. Crosslinking agents are grafted with the curable polydiolefin to form the pre-B-stage material. Such agents comprises the following compounds: vinyl aromatics such as styrene and vinyl toluene; halo styrenes; vinyl naphthalenes; alkyl acrylates, and methacrylates; alkyl fumarates, e.g., diethyl fumarate; allyl esters; acrylonitrile; vinyl chloride; and vinylidene chloride. The preferred compounds are vinyl toluene and styrene. The cross-linking agent is incorporated within the range of 5 to 80 parts, preferably 40 to 60 parts, per 100 parts of the curable liquid mix (p.h.m.).

A catalyst, 0.01 to 10 parts, preferably 0.2 to 1.0 part, p.h.m., is also included in the mix and is advantageously the free radical or peroxide type. Therefore, peroxides such as hydroperoxides, per-esters and per-acids are applicable. The preferred catalysts are dicumyl peroxide, di-t-butyl peroxide, benzoyl peroxide, and mixtures thereof.

In accordance with this invention, the resinifiable polymeric mix with the above compounds therein is grafted to form a pre-B-stage product by heating at a temperature between 200° and 300° F., preferably 240° and 275° F., for 15 to 320 minutes. The pre-B-stage is not the same as a B-stage partial cure and/or a complete cure. The pre-B-stage has only two dimensional crosslinking whereas the B-stage has three dimensional crosslinking. Furthermore, the pre-B-stage is soluble in hydrocarbon and oxygenated solvents; in contrast, the B-stage is not soluble in these compounds. The comparison of properties of the three stages are demonstrated herebelow.

| Pre-B-Stage | B-Stage | Complete Cure |
| --- | --- | --- |
| Soluble in solvents. Viscosity between 2 and 12 poise. | Soft gel, swells in solvents and therefore not soluble in solvents. | Hard solid, affected very slightly by, or inert to, solvents. |

The graph shown in FIG. 1 illustrates the different time and temperature conditions required to provide each type of cure. For example, if a typical graft mix is heated to 265° F. for 60 minutes, a pre-B-stage material is formed; if the temperature is 325° F. and time is 30 minutes, a B-stage product is provided; if 360° F. for 90 minutes are the conditions employed, a complete cure results therefrom. Each of these stages of cure may be reached by curing at higher temperatures using shorter times. However, for making pre-B-stage material, a lower temperature (longer time cycle), and a diluent, gives better control of the product.

The reinforcing elements that are applicable to this invention include such items as mineral materials, e.g., glass, asbestos, mica, rock, and celite; vegetable materials, e.g., cotton, linen, rayon, and silk; organic materials, e.g., hair, nylon, and Orlon; and metallic materials, e.g., iron, aluminum, and copper. Reinforcing elements may comprise 80% by weight of the reinforced plastic, preferably 35 to 80%. However, the preferred material is glass fiber. In accordance with this invention, glass fiber is defined as any fibrous glass unit to include filament yarns, rovings, reinforcing mats, staple yarns, woven fabrics, and milled fibers. A protective size may be applied to glass fibers. Examples of sizes which can be used are as follows: starch-mineral oil mixtures; polyvinyl acetate; polyisobutylene; copolymers of isobutylene with isoprene; and copolymers of butadiene with styrene. It is within the scope of this invention to use glass fiber which has been treated with an unsaturated organic halo silane, having the formula $R_nSiX_{4-n}$ wherein R is vinyl or allyl group, $n$ is a positive integer equal to 1, 2, or 3, and X is halogen. It is also possible to incorporate 0.1 to 5 parts of a silane ester in the resinifiable mix which has the general formula $R_nSi(OR_1)_{4-n}$, wherein R is an unsaturated group, e.g., vinyl, allyl, methallyl, or crotyl group; $n$ is a positive integer equal to 1, 2, or 3; and $R_1$ is an alkyl or aryl group or substitutes thereof. It is believed that the above-described silanes react with the hydroxyl groups in the glass. The unsaturated or vinyl portion of the molecule, bound to the glass through the silicon atom, reacts with the polymer during the curing step, thus effectively bonding the curable polymer and the glass fiber.

The reinforcing element can be laminated, as per the instant invention, with the resinifiable polymer mix which has been cured to the pre-B-stage to form a reinforced plastic. A reinforced plastic, according to this invention, is defined as a composite mass of a reinforcing element and a thermosetting resin. This, therefore, includes layers of cloth and resin; fibers embedded in a resin; and fibers saturated with resin and formed in a hollow cylindrical pipe. Accordingly, lamination can be accomplished by any known method. For example, the pre-B-stage mix can be combined with glass cloth by brush impregnation; by being poured into the center of several plies of dry cloth assembled on cellophane-covered glass plate; and by dipping the cloth into the mix. Thus, one method used in the manufacture of a solid rectangular laminate is to form layers of the pre-B-stage mix and glass fiber. After the desired thickness is obtained, the layers are cured to a unitary reinforced plastic. Another method can be used for the manufacture of cylindrical hollow pipes. Glass fibers can be dipped in the pre-B-stage mix and wound about a steel mandrel. This can be accomplished by any known method. In one method, the fiber rovings, e.g., glass fibers, are wound at an angle to the axis of the mandrel circumferentially in superimposed layers to form a peripheral shell of the pipe (U.S.P. 2,714,414). After the desired shape is obtained, the wrapping can be cured to form the unitary rigid pipe.

The laminated reinforcing element and pre-B-stage mix can then be subjected to a complete cure to provide a hard, solid reinforced plastic. It is necessary, however, to incorporate 15 to 60 parts of additional monomer such as vinyl toluene in the pre-B-stage mix. This complete cure can be accomplished by heating in a closed mold at a temperature between 310° and 340° F. for 40 to 20 minutes.

It is also within the purview of this invention to partially cure to a B-stage product by heating the laminated reinforcing element with the pre-B-stage mix thereon in a closed mold at a temperature of 270° to 310° F. for 10 to 5 minutes in the presence of 15 to 60 parts of additional monomer incorporated therein. This B-stage product can then be subjected to a complete cure by utilizing a temperature range of 310° to 340° F. for 30 to 5 minutes.

Thus, in accordance with the instant invention, it is now possible to obtain a reinforced plastic without bubbles forming therein. Furthermore, the time for curing has been decreased. Accordingly, this end product can now be used in forming flat sheets and industrial panels.

The following examples are submitted to illustrate and not to limit this invention. Unless otherwise indicated, all parts and percentages are based on weight.

EXAMPLE I

A butadiene-styrene drying oil was prepared from the following charge:

| | Parts |
|---|---|
| Butadiene | 80 |
| Styrene | 20 |
| Varsol [1] | 200 |
| Dioxane | 40 |
| Isopropyl alcohol | 0.2 |
| Sodium [2] | 1.5 |

[1] Straight-run mineral spirits; API gravity, 49.0; flash, 105° F.; boiling range, 150° to 200° C.; solvent power, 33–37 Kauri-Butanol value (reference scale: Benzene–100 K.B value, n-heptane 25.4 K.B. value).
[2] Dispersed to a particle size of 10 to 50 microns by means of an Eppenbach homo-mixer.

This polymeriaztion of this charge was carried out at 50° C. in a 2-liter autoclave provided with a mechanical agitator. Complete conversion was obtained in 4.5 hours. The catalyst was destroyed and removed from the resulting crude product and essentially all of the solvent removed by stripping to give a product of essentially 100% NVM. The resulting product had a viscosity of 1.5 poise at 50% NVM in Varsol solution and the non-volatile portion thereof had an average molecular weight of about 8,000.

A resinifiable mix was prepared by combining 85 parts of the above copolymer with 15 parts of vinyl toluene and 0.04 part of dicumyl peroxide. This mix was then grafted at a temperature of 300° F. for 35 minutes to form a pre-B-stage product. The pre-B-stage mix was then diluted with additional vinyl toluene until 50 parts were incorporated therein, and 1.5 parts di-t-butyl peroxide and 2 parts dicumyl peroxide catalysts were added.

Fourteen plies of glass cloth with a A-172 finish thereon were impregnated with this diluted pre-B-stage mix and then placed in a ⅛ inch closed press mold. The subsequent complete curing was performed at a temperature of 340° F. for 20 minutes to provide a reinforced plastic laminate therefrom with the absence of bubbles occurring therein. The flexural strength was recorded at a level of 42,100 p.s.i.g.

A laminate was made from 50 parts resin, 50 parts vinyl toluene, 2 parts dicumyl peroxide, and 1.5 parts di-t-butyl peroxide. This laminate was cured for 20 minutes at 340° F., and a laminate of poorer quality with numerous bubbles thereon was obtained.

EXAMPLE II

Ninety parts of the copolymer of Example I were mixed with 10 parts of vinyl toluene and 0.04 part of dicumyl peroxide. This resinifiable mix was subsequently heated at elevated temperatures and the viscosity was measured at various time intervals as indicated in Table I.

*Table I*

| Time in Minutes | Temperature in ° F. | Viscosity [1] of Solution |
|---|---|---|
| 0 | 266 | |
| 15 | 275 | 1.40 |
| 30 | 271 | 2.00 |
| 45 | 255 | 2.41 |
| 60 | 258 | 2.63 |
| 75 | 266 | 2.91 |
| 90 | 266 | 3.20 |
| 105 | 266 | 4.85 |
| 120 | 262 | 6.30 |
| 135 | 262 | 9.80 |
| 143 | | [2] 15.80 |

[1] Gardner viscosity at 25° C.
[2] Showed signs of gelling.

This example demonstrates that a pre-B-stage product is formed within certain temperature-time conditions. However, at certain other conditions, a B-stage cure or complete cure will be provided as indicated by the gelling which occurs after an extended period of time (143 minutes).

Having set forth the general nature and embodiments of the present invention, the true scope is particularly pointed out in the appended claims.

What is claimed is:

1. A process which comprises preparing a resinifiable mix comprising a completely polymerized liquid $C_4$ to $C_6$ conjugated diolefin, a volatile agent for crosslinking said polymer, and a peroxide catalyst; grafting said mix by heating at a temperature between 200° and 300° F. for 15 to 320 minutes to form a pre-B-stage product which has a viscosity between 2 and 12 poise; incorporating additional crosslinking agent therein; laminating a reinforcing element with said pre-B-stage product having said additional crosslinking agent therein; curing said laminated reinforcing element in a closed mold to provide a reinforced plastic with the absence of bubbles therein.

2. The process according to claim 1 in which the diolefin polymer is selected from the group consisting of the homopolymer of butadiene and the copolymer of butadiene with styrene.

3. The process according to claim 1 in which the crosslinking agent is selected from the group consisting of styrene, vinyl toluene, a halo styrene, a vinyl naphthalene, an alkyl acrylate, an alkyl fumarate, an allyl ester, acrylonitrile, a vinyl chloride, and a vinylidene chloride.

4. The process according to claim 1 in which the peroxide catalyst is selected from the group consisting of dicumyl peroxide, di-t-butyl peroxide, benzoyl peroxide, and mixtures thereof.

5. A process which comprises preparing a resinifiable mix comprising a completely polymerized liquid $C_4$ to $C_6$ conjugated diolefin, a volatile agent for crosslinking said polymer, and a peroxide catalyst; grafting said mix by heating at a temperature between 200° and 300° F. for 15 to 320 minutes to form a pre-B-stage product which has a viscosity between 2 and 12 poise; incorporating additional crosslinking agent therein; laminating a reinforcing element with said pre-B-stage product having said additional crosslinking agent therein; partially curing said laminated reinforcing element in a closed mold to form a B-stage product; and subjecting said B-stage product to a final cure to provide a reinforced plastic with the absence of bubbles therein.

6. A process which comprises preparing a reinifiable mix comprising a completely polymerized liquid $C_4$ to $C_6$ conjugated diolefin, a volatile agent for crosslinking said polymer, and a peroxide catalyst; grafting said mix by heating at a temperature between 200° and 300° F. for 15 to 320 minutes to form a pre-B-stage product which has a viscosity between 2 and 12 poise and is soluble in hydrocarbon and oxygenated solvent; incorporating additional crosslinking agent therein; and curing said pre-B-stage product having said additional crosslinking agent therein in a closed mold to provide a resin with the absence of bubbles therein.

7. A process which comprises preparing a resinifiable mix comprising a completely polymerized liquid $C_4$ to $C_6$ conjugated diolefin, a volatile agent for crosslinking said polymer, and a peroxide catalyst; and grafting said mix by heating at a temperature of 200° to 300° F. for 15 to 320 minutes to provide a pre-B-stage resinifiable product which has a viscosity between 2 and 12 poise.

8. A curable non-volatile composition of matter prepared by forming a resinifiable mix comprising a completely polymerized liquid $C_4$ to $C_6$ conjugated diolefin, a volatile agent for crosslinking said polymer, and a peroxide catalyst; and grafting said mix by heating at a temperature between 200° and 300° F. for 15 to 320 minutes to form said pre-B-stage product which has a viscosity between 2 and 12 poise.

9. A pre-B-stage product which comprises a completely polymerized liquid $C_4$ to $C_6$ conjugated diolefin and an agent for crosslinking said polymer cured by heating at a temperature between 200° and 300° F. for 15 to 320 minutes in the presence of a peroxide catalyst; said pre-B-stage product having a viscosity between 2 and 12 poise.

10. A process which comprises preparing a resinifiable mix comprising a completely polymerized liquid copolymer of butadiene and styrene, vinyl toluene, and dicumyl peroxide; grafting said mix by heating at a temperature of 300° F. for 35 minutes to form a pre-B-stage product which has a viscosity between 2 and 12 poise; incorporating additional vinyl toluene therein; laminating glass cloth with said pre-B-stage product having said additional vinyl toluene therein; and curing said laminated glass cloth in a closed mold to provide a reinforced plastic with the absence of bubbles therein.

References Cited in the file of this patent

UNITED STATES PATENTS

| | | |
|---|---|---|
| 2,338,741 | Soday | Jan. 11, 1944 |
| 2,609,353 | Rubens | Sept. 2, 1952 |
| 2,688,009 | Crouch | Aug. 31, 1954 |
| 2,755,270 | Hayes | July 17, 1956 |
| 2,814,313 | Tate | Nov. 26, 1957 |
| 2,892,972 | Ross | June 30, 1959 |

FOREIGN PATENTS

| | | |
|---|---|---|
| 771,723 | Great Britain | Apr. 3, 1957 |
| 775,971 | Great Britain | May 29, 1957 |